(12) United States Patent
Kim et al.

(10) Patent No.: US 7,481,407 B2
(45) Date of Patent: Jan. 27, 2009

(54) BRACKET FOR USE IN INSTALLING A SENSOR IN A VEHICLE

(75) Inventors: Wanil Kim, Kyonggi-do (KR); Jeong Woo Lee, Kyonggi-do (KR)

(73) Assignee: Mando Corporation, Kyonggi-do (KR)

( * ) Notice: Subject to any disclaimer, the term of this patent is extended or adjusted under 35 U.S.C. 154(b) by 358 days.

(21) Appl. No.: 11/030,178

(22) Filed: Jan. 7, 2005

(65) Prior Publication Data

US 2005/0156087 A1    Jul. 21, 2005

(30) Foreign Application Priority Data

Jan. 16, 2004    (KR) ...................... 10-2004-0003210

(51) Int. Cl.
  *A47B 96/00* (2006.01)
(52) U.S. Cl. ............................ 248/225.11; 248/220.21; 180/282
(58) Field of Classification Search ............ 248/220.21, 248/225.11, 309.1, 346.03, 346.5, 224.8, 248/220.22, 550; 73/493, 866.5, 431; 180/274, 180/282
See application file for complete search history.

(56) References Cited

U.S. PATENT DOCUMENTS

| | | | | |
|---|---|---|---|---|
| 4,747,570 A | * | 5/1988 | Takahashi | 248/309.1 |
| 5,026,016 A | * | 6/1991 | Lisowski | 248/314 |
| 5,035,389 A | * | 7/1991 | Wang | 248/224.51 |
| 5,707,033 A | * | 1/1998 | Holt et al. | 248/225.11 |
| 5,945,945 A | * | 8/1999 | Wagner et al. | 342/359 |
| 6,015,123 A | * | 1/2000 | Perez et al. | 248/220.1 |
| 6,728,613 B2 | * | 4/2004 | Ishizaki et al. | 701/36 |
| 6,734,830 B1 | * | 5/2004 | Bickham | 343/880 |
| 6,827,320 B2 | * | 12/2004 | Yeh | 248/220.22 |
| 2004/0232293 A1 | * | 11/2004 | Lindbeck | 248/225.11 |

FOREIGN PATENT DOCUMENTS

KR    20-1998-0023792    12/1998

* cited by examiner

*Primary Examiner*—A. Joseph Wujciak, III
(74) *Attorney, Agent, or Firm*—Bacon & Thomas, PLLC

(57) ABSTRACT

A bracket for use in installing a sensor in a vehicle includes a main body portion having one or more screw holes formed therein, and slot portions for receiving and holding end portions of a back plate of the sensor. The slot portions are connected to end portions of the main body portion, and one or more screw holes formed in the main body correspond to one or more screw holes formed in the back plate. When the back plate is fitted into the slot portions, the slot portions restrict movement of the back plate therein.

2 Claims, 1 Drawing Sheet

BRACKET FOR USE IN INSTALLING A SENSOR IN A VEHICLE

FIELD OF THE INVENTION

The present invention relates to a bracket for use in installing a sensor in a vehicle; and, more particularly, to a bracket for use in installing a sensor in a vehicle, which is capable of guaranteeing a secure installation of an acceleration sensor on a vehicle body.

BACKGROUND OF THE INVENTION

Recently, various systems and technologies for improving driving safety and ride comfort of a vehicle have been developed and applied to the vehicle. Most of such systems, including a semi active suspension system, control damping force characteristics of dampers according to behavior information of the vehicle, particularly, acceleration information of a vehicle body. That is, each damper of, for example, the semi active suspension system is independently controlled by using the vertical acceleration information detected by an acceleration sensor installed on the vehicle body above a corresponding wheel.

Referring to FIG. 1, there is provided a front view of a conventional bracket for use in installing an acceleration sensor 10 in a vehicle, which is used in the system for improving the driving safety and ride comfort of the vehicle. As shown therein, the acceleration sensor 10 is combined with a bracket 20 by means of a pair of screws (not shown), and is installed on a vehicle body (not shown) via the bracket 20 which is mounted on the vehicle body by means of another pair of screws (not shown). The bracket 20 is of a plate shape and has a pair of screw holes 22 formed in two opposite end portions of an upper portion thereof and another pair of screw holes 24 formed in two opposite end portions of a middle portion thereof. The screw holes 22 are used to combine the acceleration sensor 10 with the bracket 20 while the screw holes 24 are used to mount the bracket 20 on the vehicle body.

Since, however, the acceleration sensor 10 installed on the vehicle body via the bracket 20 is exposed to gravity levels as high as 10 G because of impacts, vibrations and like induced by irregularities of a road surface, and to multidirectional forces while the vehicle is running, there always exists a high risk of looseness or breakage of the screw joint between the acceleration sensor 10 and the bracket 20. If the looseness or breakage of the screw joint occurs, a malfunction or failure of the acceleration sensor 10 can be caused which in turn leads to a malfunction of the system for improving the driving safety and ride comfort of the vehicle by using acceleration information of the vehicle body such as the semi active suspension system.

SUMMARY OF THE INVENTION

It is, therefore, an object of the present invention to provide a bracket for installing a sensor in a vehicle, which is capable of firmly retaining the acceleration sensor in initial mounting place and attitude by enhancing a combining force between the bracket and the acceleration sensor and by restricting movement of the acceleration sensor in left, right, front and rear directions.

In accordance with the present invention, there is provided a bracket for use in installing a sensor in a vehicle, the sensor being provided with a back plate having one or more screw holes formed therein and a sensing portion connected to the back plate, the bracket including: a main body portion having one or more screw holes formed therein, said one or more screw holes corresponding to said one or more screw holes formed in the back plate; and slot portions for receiving and holding end portions of the back plate, the slot portions being connected to both opposite end portions of the main body portion, wherein when the back plate is fitted into the slot portions, the slot portions restrict movement of the back plate therein.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENT

Hereinafter, a preferred embodiment of the present invention will be described with reference to the accompanying drawing.

Figure 1:
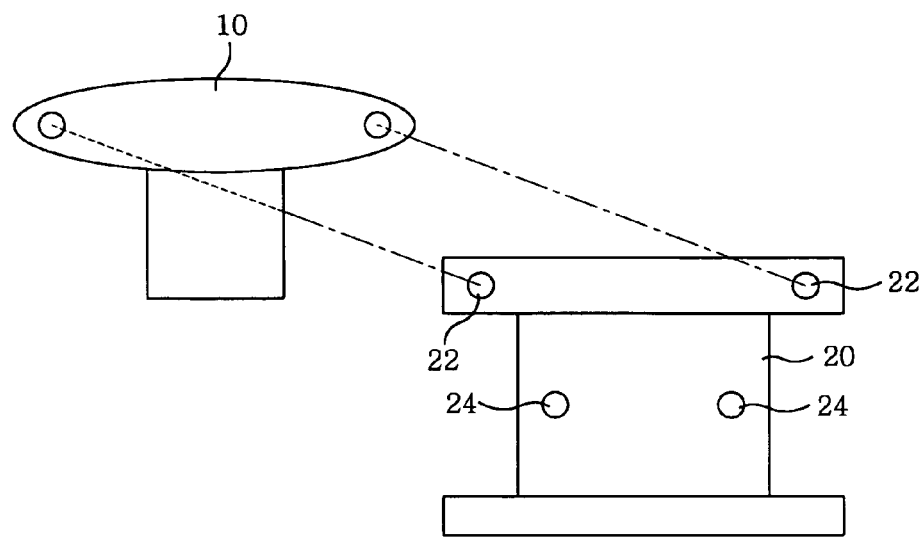
FIG. 1 is a schematic front view of a conventional bracket for use in installing an acceleration sensor in a vehicle.
Figure 2:
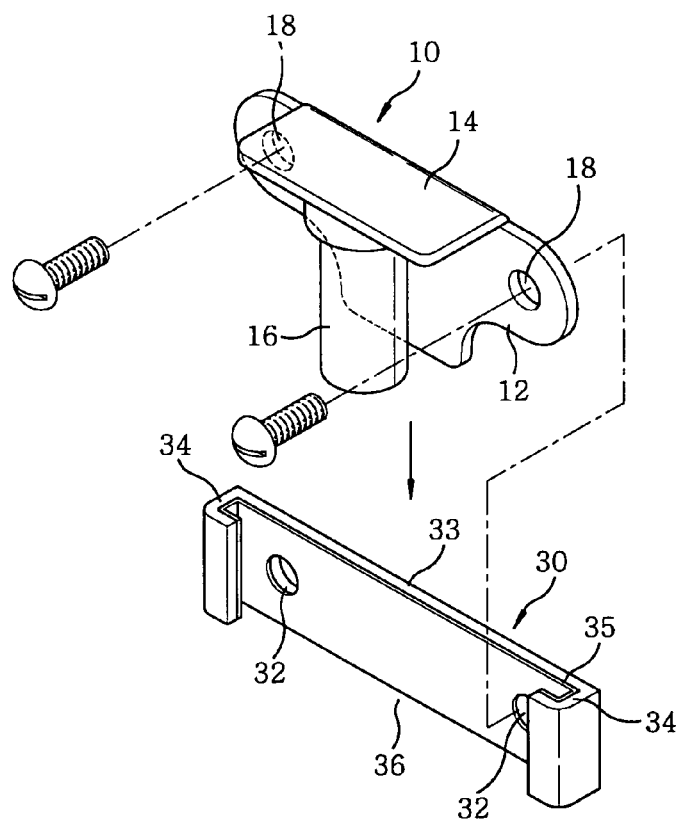
FIG. 2 illustrates a perspective view of a bracket for use in installing a sensor in a vehicle in accordance with a preferred embodiment of the present invention.

Referring to FIG. 2, there is illustrated a perspective view of a bracket for use in installing a sensor in a vehicle in accordance with the preferred embodiment of the present invention.

As shown therein, formed in left and right end portions of a back plate 12 of the acceleration sensor 10 to be combined with the bracket 30 are a pair of screw holes 18 for use in screw joint of the acceleration sensor 10 and the bracket 30 onto a vehicle body of a vehicle. Further, on a lower surface of an upper plate 14, which is integrally connected to an upper end of the back plate 12 in such a manner that it is protruded forward while forming a substantially right angle to the back plate 12, a sensing portion 16 of the sensor 10 for measuring acceleration of the vehicle body is installed.

The bracket 30 for firmly installing, for example, the acceleration sensor 10 on the vehicle body in accordance with the preferred embodiment of the present invention includes a main body portion 33 formed of, for example, a rectangular metal plate with a predetermined thickness and a pair of C-shaped slot portions 34 integrally connected to both opposite ends of the main body portion 33, respectively, for receiving and firmly holding left and right end portions of the back plate 12 of the acceleration sensor 10.

The left and right end portions of the back plate 12 of the acceleration sensor 10 are slid into the slot portions 34 in a direction of an arrow to be fitted into the slot portions 34, so that the acceleration sensor 10 and the bracket 30 are firmly combined with each other. At this time, the sensing portion 16 mounted on the lower surface of the upper plate 14 of the acceleration sensor 10 is located in an opening 36 formed between the pair of slot portions 34.

The slot portions 34 firmly hold the left and right portions of the back plate 12 of the acceleration sensor 10 in left, right, front and rear directions. That is, front, rear and side surface of each end portion of the back plate 12 are in contact with inner surface of the slot portion 34. Accordingly, left, right, back and forth directional movements of the acceleration sensor 10 within the slot portions 34 of the bracket 30 due to impacts, vibrations and the like from the road can be prevented.

Moreover, formed on the inner surfaces of the slot portions 34 and a front surface of the main body portion 33 is a frictional layer 35 with a predetermined thickness such as a rubber layer (i.e., a rubber bush), which serves to enhance a combining force between the back plate 12 of the acceleration sensor 10 and the bracket 30 by increasing friction therebetween. The frictional layer 35 also serves to prevent the impacts and the vibrations from the road from being directly transferred to the acceleration sensor 10. In addition, the frictional layer 35 can consist of plural layers.

Further, formed in the main body portion 33 of the bracket 30 are screw holes 32 which correspond to the screw holes 18 formed in the back plate 12 of the acceleration sensor 10 to be combined with the bracket 30 by being inserted into the slot portions 34. Thus, by using only one pair of screws, the acceleration sensor 10 and the bracket 30 can be firmly fixed together to the vehicle body above the wheel of the vehicle.

Since the friction between the back plate 12 and the bracket 30 is increased due to the presence of the frictional layer 35 therebetween and the slot portions 34 firmly hold the back plate 12 of the acceleration sensor 20 in the left, right, front and rear directions, the bracket 30 can effectively prevent the movement of the acceleration sensor 10 even in case the screw joint between the bracket 30 and the sensor 10 becomes loose because of the impacts, the vibrations and the like from the road. Therefore, the bracket 30 is capable of retaining the acceleration sensor 10 in initial mounting place and attitude without being affected by impacts and vibrations, so that the acceleration sensor 10 can generate acceleration information of the vehicle body while minimizing noise of output signals.

In addition, when a mounting surface of the vehicle body on which the bracket 30 is mounted is not a flat surface but a round shape such as a circular or an elliptical surface, an acceleration sensor 10 with a rounded back plate 12 is employed. In such a case, the main body portion 33 of the bracket 30 of the present invention can be designed to have a round shape as well.

Furthermore, although in the above described preferred embodiment of the present invention the slot portions 34 are formed at the two opposite ends of the main body portion 33 in such a manner that the acceleration sensor 10 is slid into the slot portions 34 of the bracket 30 in up-down direction, the slot portions 34 may be formed in such a manner that the acceleration sensor 10 is slid into the slot portions 34 of the bracket 30 in the left-right direction. In such a case, the slot portions 34 can hold the back plate 12 of the sensor 10 firmly in front, rear, upward and downward directions.

Further, although the acceleration sensor is used in the above description, it should be noted that the bracket of the present invention be applicable to any other kinds of sensors.

As described above, the bracket for use in installing an acceleration sensor in accordance with the preferred embodiment of the present invention includes slot portions for preventing left, right, back and forth directional movements of the acceleration sensor and an frictional layer formed on the inner surfaces of the slot portions and the front surface of the main body portion to increase a friction between the acceleration sensor and the bracket. Therefore, the movement of the acceleration sensor within the bracket can be effectively prevented, thereby making it possible to retain the acceleration sensor in the initial mounting place and attitude and thus allowing the acceleration sensor to generate correct signals with reduced noises. As a result, a system, such as a semi active suspension system, for improving the driving safety and ride comfort of the vehicle by using acceleration information of the vehicle body can be operated accurately.

While the invention has been shown and described with respect to the preferred embodiment, it will be understood by those skilled in the art that various changes and modifications may be made without departing from the spirit and scope of the invention as defined in the following claims.

What is claimed is:

1. A bracket for use in installing a sensor in a vehicle, the bracket comprising:

a back plate having one or more screw holes formed therein;

an upper plate connected to the back plate and forwardly protruded from the back plate, wherein the upper plate and the back plate together create L-shape;

a sensing portion connected to a lower surface of the upper plate, the sensing portion being an acceleration sensor;

a main body portion having one or more screw holes formed therein;

slot portions for receiving and holding end portions of the back plate, the slot portions being connected to both opposite end portions of the main body portion, wherein when the back plate is fitted into the slot portions, the slot portions restrict movement of the back plate therein; and wherein the one or more screw holes formed in the main body portion correspond to the one or more screw holes formed in the back plate so that the back plate and the main body portion can be fixed together to a vehicle by one or more screws.

2. The bracket of claim 1, further comprising a frictional layer formed on at least one portion of inner surfaces of the slot portions and a front surface of the main body portion.

\* \* \* \* \*